United States Patent
Starr

(10) Patent No.: US 9,174,620 B2
(45) Date of Patent: Nov. 3, 2015

(54) SLIP CONTROL BRAKING PUMP HAVING A HIGH PRESSURE SEALING STRUCTURE

(71) Applicant: Kelsey-Hayes Company, Livonia, MI (US)

(72) Inventor: Joseph A. Starr, Plymouth, MI (US)

(73) Assignee: Kelsey-Hayes Company, Livonia, MI (US)

( * ) Notice: Subject to any disclaimer, the term of this patent is extended or adjusted under 35 U.S.C. 154(b) by 78 days.

(21) Appl. No.: 13/746,026

(22) Filed: Jan. 21, 2013

(65) Prior Publication Data

US 2014/0203625 A1 Jul. 24, 2014

(51) Int. Cl.
| | |
|---|---|
| B60T 13/16 | (2006.01) |
| F04B 19/00 | (2006.01) |
| B60T 11/236 | (2006.01) |
| B60T 13/14 | (2006.01) |
| B60T 17/02 | (2006.01) |
| F04B 1/04 | (2006.01) |
| F04B 53/02 | (2006.01) |
| F04B 53/16 | (2006.01) |
| B60T 8/40 | (2006.01) |

(52) U.S. Cl.
CPC ............. *B60T 13/161* (2013.01); *B60T 11/236* (2013.01); *B60T 13/146* (2013.01); *B60T 17/02* (2013.01); *F04B 1/0421* (2013.01); *F04B 1/0439* (2013.01); *F04B 53/02* (2013.01); *F04B 53/164* (2013.01); *B60T 8/4031* (2013.01)

(58) Field of Classification Search
USPC .......................... 303/10, 116.4; 417/313, 437
See application file for complete search history.

(56) References Cited

U.S. PATENT DOCUMENTS

| | | | | |
|---|---|---|---|---|
| 4,601,235 | A  * | 7/1986 | Roberts | 92/245 |
| 6,109,896 | A  * | 8/2000 | Schuller et al. | 417/549 |
| 6,652,245 | B2 * | 11/2003 | Hauser et al. | 417/313 |
| 2001/0048884 | A1* | 12/2001 | Siegel et al. | 417/470 |
| 2003/0080613 | A1* | 5/2003 | Yamaguchi et al. | 303/116.4 |
| 2006/0022516 | A1* | 2/2006 | Hool et al. | 303/10 |
| 2007/0176484 | A1* | 8/2007 | Reuter et al. | 303/10 |
| 2013/0064692 | A1* | 3/2013 | Sechler | 417/313 |

* cited by examiner

*Primary Examiner* — Christopher Schwartz
(74) *Attorney, Agent, or Firm* — MacMillan, Sobanski & Todd, LLC

(57) ABSTRACT

A vehicular hydraulic braking pump includes a sleeve having an inner bore defining an inner bore surface and a piston having a stop collar and a ramped seal face. The stop collar, ramped seal face, and the inner bore cooperating to define a seal pocket which traps a high pressure seal therein. The ramped seal face provides contact of the high pressure seal to the sleeve inner bore that is proportional to fluid pressure acting on the high pressure seal.

20 Claims, 7 Drawing Sheets

Fig. 4A, 4B

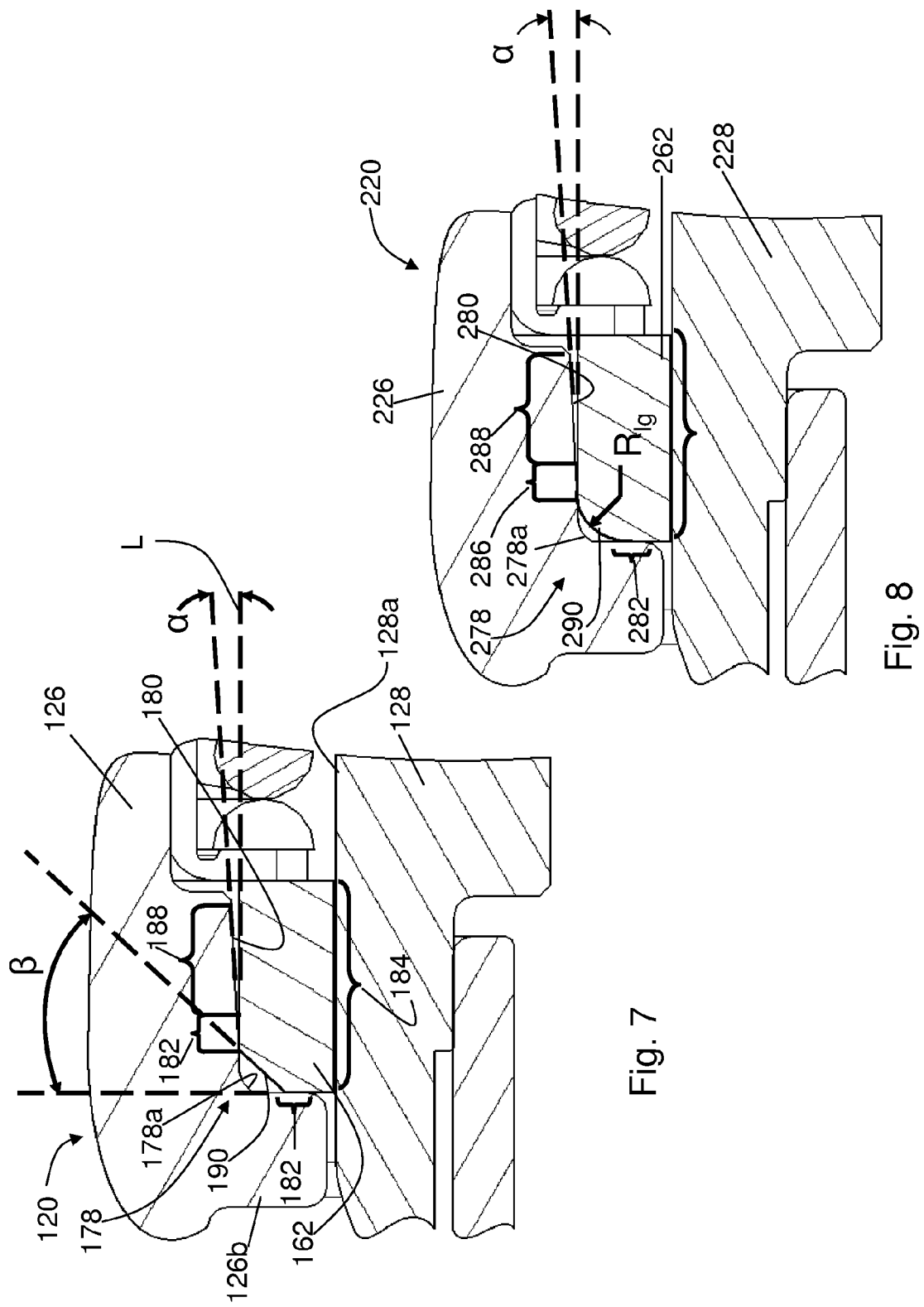

US 9,174,620 B2

SLIP CONTROL BRAKING PUMP HAVING A HIGH PRESSURE SEALING STRUCTURE

BACKGROUND OF THE INVENTION

This invention relates in general to vehicular braking systems and, in particular, to hydraulic braking systems having pump-operated pressurizing systems.

Hydraulic braking systems, particularly for vehicular applications, can be equipped with pump and controller systems that dynamically vary the fluid pressure in response to sensor inputs. These sensor inputs provide information relating to the dynamic operating state of the vehicle, i.e., skidding conditions, tractive effort conditions, and steering reactions, to name a few. These braking systems, sometimes referred to as antilock braking systems (ABS), traction control systems (TCS), and electro-hydraulic braking systems (EHB), use a motor-driven pump to supply fluid pressure to a wheel-end brake mechanism. The fluid pressure is modulated by a valve circuit to provide proper distribution of braking effort to each wheel in response to a particular vehicle dynamic state.

The hydraulic pumps used to generate hydraulic pressure may be piston-type hydraulic pumps that supply fluid pressure by means of a piston that axially reciprocates within a cylinder bore. These piston pumps generally include a plurality of components, such as pistons, cylinders, bushings, springs, filters, and seals, for example, that are assembled into a pump housing. Because of the generally high fluid pressure levels and the high pressure modulation speeds needed to support antilock braking systems, these hydraulic pumps are precision assemblies requiring that tight machining and assembly tolerances be maintained. Additionally, the design of high pressure sealing systems, which includes material selection and dimensional tolerancing, needs to accommodate both the high fluid pressures and piston reaction speeds without leaking or excessive wearing. Thus, it would be desirable to provide a brake system hydraulic pump that is easier to manufacture and improves fluid pumping performance.

SUMMARY OF THE INVENTION

This invention relates to hydraulic pumps for vehicular braking systems. In particular, this invention relates to an improved seal configuration for a hydraulic pump for use in a vehicular braking system. In one aspect, the improved seal configuration includes a ramped seal surface that traps and seals a high pressure seal in an electro-hydraulic braking system. The ramped seal surface provides a self-energizing mounting arrangement where increasing fluid pressure provides an increasing sealing surface area. In another aspect, the improved seal configuration includes a high pressure seal having a low residual strain material. In a particular embodiment of this aspect, the high pressure seal material is a PTFE-based material.

A vehicular hydraulic braking pump includes a sleeve, a piston, and a high pressure seal. The sleeve has an inner bore that defines an inner bore surface. The piston has a stop collar and a ramped seal face that, along with the inner bore, cooperate to define a seal pocket. A high pressure seal is disposed in the seal pocket. In one embodiment, the ramped seal face is formed in a relative angular orientation to the sleeve inner bore. In another embodiment, the ramped seal face includes a first region that contacts the high pressure seal and a second region that defines a clearance between the high pressure seal and the ramped seal face. In one aspect of these embodiments, the volume of the seal pocket is larger than the volume of the high pressure seal.

Various aspects of this invention will become apparent to those skilled in the art from the following detailed description of the preferred embodiments, when read in light of the accompanying drawings.

BRIEF DESCRIPTION OF THE DRAWINGS

FIG. 7 is an enlarged cross sectional view of another embodiment of a high pressure seal having a large radius interface region.

FIG. 8 is an enlarged cross sectional view of another embodiment of a high pressure seal having a chamfered interface region.

DETAILED DESCRIPTION OF THE PREFERRED EMBODIMENTS

Figure 2:
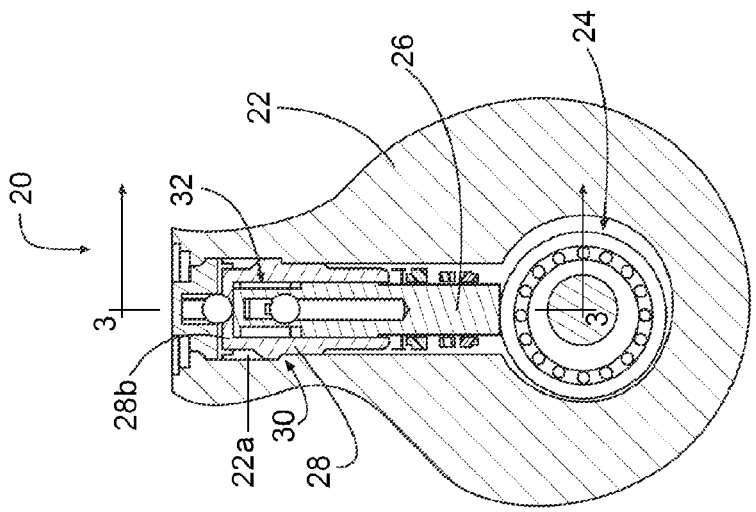
FIG. 2 is an enlarged, schematic cross sectional view of one of the hydraulic pumps of FIG. 1.
Figure 1:
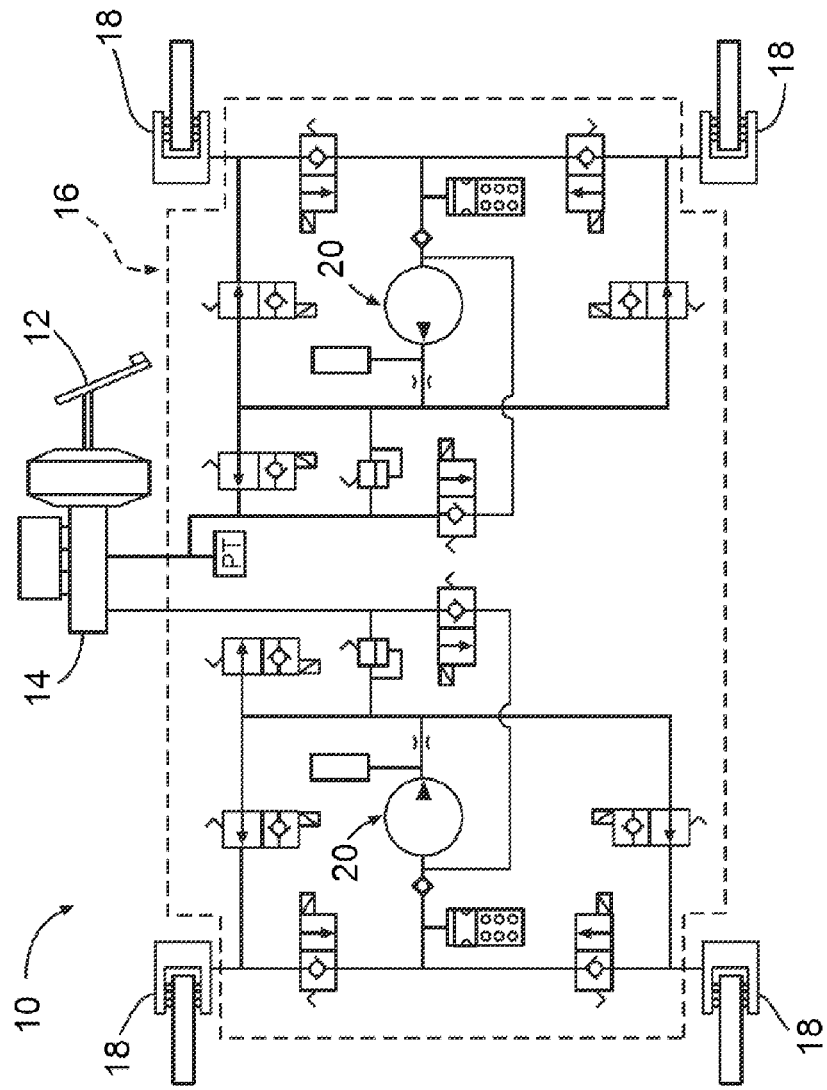
FIG. 1 is a schematic representation of a hydraulic brake system having a hydraulic pump assembly.

Referring now to the drawings, there is schematically illustrated in FIG. 1 a vehicular brake system, shown generally at 10. The vehicular brake system 10 includes a brake pedal 12 connected to a master cylinder 14. A hydraulic circuit, configured as a hydraulic control unit (HCU) shown generally at 16, provides fluid communication between the master cylinder 14 and a plurality of wheel brakes 18. The wheel brakes 18 are shown as disc brakes but may be any type of wheel brake. The illustrated HCU 16 includes two hydraulic pumps 20, though any suitable number of pumps may be used. The pump 20 is a reciprocating piston pump, as shown in FIG. 2, that is disposed within a housing (not shown). The pump 20 pressurizes and transfers fluid between the master cylinder 14 and the wheel brakes 18. The HCU 16 further includes various valves and other components that are in fluid communication with the pumps 20 for providing, for example, anti-lock braking, traction control, vehicle stability control, and dynamic rear brake proportioning functions. It should be understood that the HCU 16 may be configured other than as depicted and may include additional, fewer, or different components. The HCU components, however, may be configured in different fluid communication arrangements depending on the specified performance requirements and/or functions provided by the designated vehicular brake system.

Figures 3, 4A, 4B:
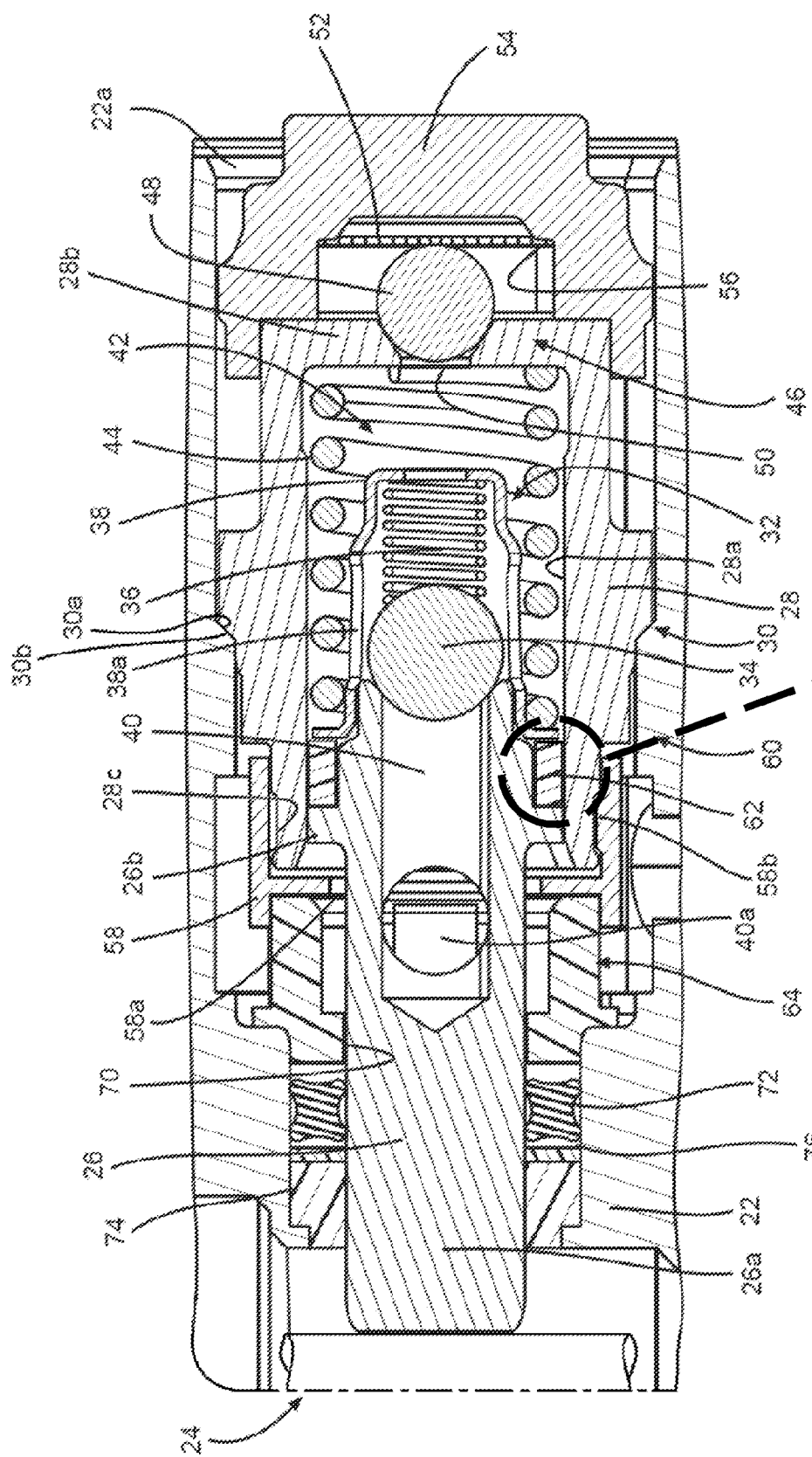
FIG. 3 is an enlarged cross sectional view of a pump cartridge within the hydraulic pump of FIG. 2 having an energizing high pressure seal arrangement in accordance with the invention.
FIG. 4A is a further enlarged cross sectional view of the high pressure seal arrangement of FIG. 3.
FIG. 4B is a cross sectional view of the high pressure seal arrangement of FIG. 2 showing loads applied to the seal structure.
Figures 4A, 4B:
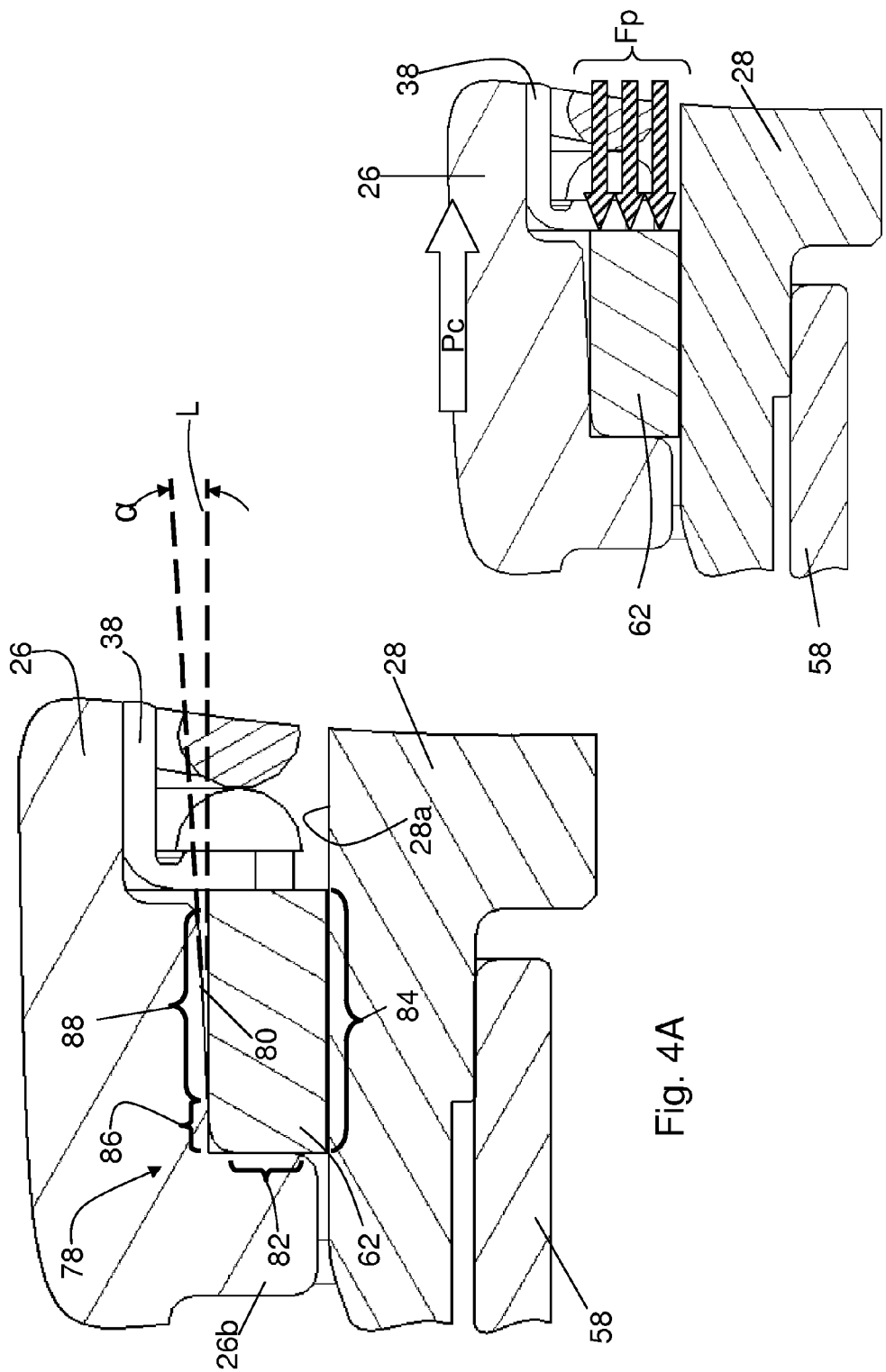

Referring now to FIGS. 2 and 3, the pump 20 includes a housing 22 having a cylinder bore 22a, and a motor-driven eccentric, shown generally at 24. A piston 26 includes a first portion that is telescopically received within an inner bore 28a of a sleeve 28. The sleeve 28 also includes a sleeve end 28b. The sleeve 28, when disposed in the cylinder bore 22a of the housing 22, contacts a sleeve seat, shown generally at 30, which is illustrated as two mating surfaces. The mating surfaces include a first seat 30a formed in the cylinder bore 22a and a second seat 30b formed on the sleeve 28. The mating surfaces 30a and 30b forming the sleeve seat 30 are shown as contacting angled surfaces, though the sleeve seat 30 may be formed at any angle. The motor-driven eccentric 24 contacts a second portion of the piston 26 and, as the eccentric 24 rotates, causes the first portion of the piston 26 to reciprocate within the sleeve 28. Though shown as a single-piece piston, the first and second portions of the piston 26 may be separate components that are joined together, either by mechanical means or bonded by adhesives, welding, and the like.

Fluid is admitted into the pump 20 through an inlet valve, shown generally at 32. The inlet valve 32, as best shown in FIG. 3, includes an inlet ball 34, an inlet biasing spring 36, and a retaining cage 38. The retaining cage 38 includes at least one aperture 38a that permits fluid flow from an inlet passage 40 to a chamber 42. The inlet biasing spring 36 urges the inlet ball 34 against an end of the inlet passage 40 to form a fluid-tight seal. The inlet passage 40 includes an inlet aperture 40a that is in fluid communication with a fluid source (not shown). As the fluid overcomes the force of the biasing spring 36, the fluid is drawn past the inlet valve 32, through the apertures 38a in the retaining cage 38, and into the chamber 42 defined between the piston 26 and the sleeve 28. A piston biasing element 44, shown as a coil spring disposed within the chamber 42, urges the piston 26 against the eccentric 24. As the eccentric 24 rotates, the piston 26 reciprocates in the sleeve 28. The volume of the chamber 42 is compressed as the piston 26 is driven by the eccentric 24 toward the sleeve end 28b, thus pressurizing the admitted fluid.

The pressurized fluid exits the chamber 42 through an outlet valve, shown generally at 46. The outlet valve 46 includes an outlet ball 48 that is biased against an outlet port 50 formed through the sleeve end 28b. An outlet spring 52, reacting between an end cap 54 and the outlet ball 48, biases the outlet ball 48 against the outlet port 50. In the embodiment of FIG. 3, the outlet spring 52 is illustrated as a generally flat diaphragm spring that is disposed within a spring recess 56 formed in the end cap 54. The outlet spring 52 may alternatively be a Belleville washer having a tapered profile (i.e. concave or convex) which may be oriented having the projecting center area pointing toward the inlet valve 32 or toward the end cap 54. When employing a Belleville washer spring or a diaphragm spring, a center hole may provide a stabilizing and locating function to the outlet ball 48. In other embodiments, the outlet spring 52 may also be any spring, such as, for example, a compression coil spring, a volute spring, or a torsion spring and contact lever assembly. The diaphragm outlet spring 52, for example, reduces the overall pump packaging height, thus permitting easier design implementation in space-restricted environments. Additionally, certain noise, vibration, harshness (NVH) benefits are realized because the flat spring provides improved control of displacement of the outlet valve 46 and improved control of valve actuation speed. The pressurized fluid compresses the outlet spring 52 and permits the pressurized fluid to exit through the outlet port 50 and on to the other portions of the brake system 10.

The piston 26, sleeve 28, piston biasing spring 44, inlet and outlet valves 32 and 46, respectively, end cap 54, and a retainer 58, illustrated as a retaining collar, are assembled together to form a pump cartridge 60, as shown in FIG. 3. The retainer 58 includes a piston aperture 58a which is sized to permit a follower portion 26a of the piston 26 to extend therethrough and contact the eccentric 24, yet prevent a stop collar 26b provided on the piston 26 from passing through. The stop collar 26b also provides support for a high pressure seal 62. In the illustrated embodiment of FIG. 3, the high pressure seal 62 reciprocates with the piston 26 and seals against the inner surface of the sleeve 28, as will be described below in detail.

As shown in FIG. 3, the retainer 58 may be configured with a snap-fit projection 58b that locates within a corresponding groove 28c formed on the sleeve 28. The snap-fit projection 58b may be a complete annular ring or several discrete projections formed around the inner surface of the retainer 58. Alternatively, the groove 28c may be formed in the retainer 58 and the projection 58b may extend from the sleeve 28 if desired. In another embodiment, the retainer 58 has a generally smooth inner surface and is attached to the sleeve 28 by a press fit or interference fit. In an embodiment where the retainer 58 is formed from metal, the retainer 58 may be a slip fit over the sleeve. When the retainer 58 is assembled onto the sleeve, a projection (not shown) may be formed, such as by rolling, into the groove 28c. Alternatively, the retainer 58 may be bonded, welded, or otherwise fixed to the sleeve 28. A filter assembly is shown generally at 64. The filter 64 may be a separate component from the retainer 58 or may be integrally formed therewith. The filter assembly 64 includes a piston aperture 70 to permit the follower portion 26a of the piston 26 to extend through and contact the eccentric 24.

The follower portion 26a of the piston 26 is shown extending through the retainer 58. A seal 72, illustrated as a quad-seal or square cross-sectioned "o-ring," is disposed between the follower portion 26a of the piston 26 and a surface of the cylinder bore 22a. The seal 72, however, may be any type of seal such as, for example, a conventional "o-ring" or a lip seal. A glide ring 74 is disposed near the intersection of the cylinder bore 22a and a bore into which the eccentric 24 extends. The glide ring 74 acts as a bushing to affirmatively position the follower portion 26a of the piston 26 relative to the cylinder bore 22a. Disposed between the glide ring 74 and the seal 72 is a backing ring 76. The backing ring 76 is not required, but serves to maintain the shape and position of the seal 72 during reciprocation of the piston 26.

Referring now to FIGS. 4A and 4B, there is illustrated an enlarged view of the high pressure seal 62, as assembled between the piston 26 and the sleeve 28. The high pressure seal 62 is contained within a seal pocket, shown generally at 78. The seal pocket 78 is generally defined by the piston stop collar 26b, the inner bore 28a of the sleeve 28, and a ramped seal face 80 formed into the piston 26. The seal pocket 78 contains the high pressure seal 62 and provides orientation of the various sealing surfaces relative to the high pressure seal 62. The stop collar 26b provides a backing seal surface 82 that resists fluid pressure loads (Fp) and piston compression forces (Pc) as shown in FIG. 4B. The piston compression forces Pc are generated, on the fluid side, by the changing volume of the chamber 42. The piston compression forces Pc also increase in proportion to the linear velocity of the piston 26, which is a function of rotation speed of the eccentric 24. As the piston 26 moves faster within the bore 28a, the fluid pressure in the chamber 42 and volumetric flow through the outlet port 50 increases. This, in turn, causes a further increased magnitude of fluid pressure forces Fp acting on the high pressure seal 62. As will be described below, these forces cause deflections of the high pressure seal 62, which also increase in magnitude as the pump operating temperature increases. Because of the arrangement of the seal pocket 78 and the ramped seal face 80, the ability of the high pressure seal 62 to contain the fluid within the chamber and subsequently delivering high pressure fluid output at high efficiency and without significant leakage is improved.

The backing seal surface 82 provides a first fluid sealing surface applied against the high pressure seal 62. The inner bore 28a provides a sliding seal surface 84 against the high pressure seal 62 as the piston reciprocates within the sleeve 28. As will be discussed below, the sliding seal surface 84 may be provided with a textured surface finish, such as a honed surface finish, that enables retention of a thin oil film to reduce wear caused by relative movement of the high pressure seal 62 against the inner bore 28a. The ramped seal face 80 is formed into the piston 26 at an angle α relative to a line L which is generally parallel with the inner bore 28a of the sleeve 28. As illustrated, the ramped seal face 80 tapers from a point generally near the backing seal surface 82 of the piston 26 to a generally increasing distance away from the inner bore surface 28a. Though the ramped seal face angle α may be in any range of angles relative to the line L, in one embodiment, the angle α may be in a range from about 1 to 10 degrees. In another embodiment, the ramp angle range may be in a range of about 1 to 6 degrees. In a particular embodiment, the ramp angle α may be in a range of 2 to 4 degrees. Alternatively, though shown as a generally straight ramped surface, the ramped seal face 80 may be a portion of an arc, a stepped surface, or other geometry that functions to provide a self energizing effect to the high pressure seal 62.

As will be discussed below, the self energizing effect of the ramped seal face 80 enables the use of low strain materials for the high pressure seal 62. These low strain materials permit pump components, such as the piston 26 and the sleeve 28, to use standard, non-hardened, free-machining steels (such as AISI grade 1215 free-machining steel, and similar grades). These steel grades enable cost-effective use of manufacturing processes to provide the necessary surface finishes for leak and wear resistant operation. For example, a honed surface finish of the inner bore 28a of the sleeve 28 may be created by other manufacturing processes, such as burnishing the turned inner bore surface. This enables the machining steps needed to make the sleeve inner bore 28a to be reduced from four steps to two steps. In addition, the machining processes used are relatively simple and less expensive than those which are eliminated. As a result, in one embodiment, the surface finish of the inner bore 28a may be about 0.20 microns, $R_{pk}$ and $R_a$, compared to the prior art finishes, which are smoother by necessity and may be on the order of 0.15 $R_{pk}$ or less. In addition, other processes, such as post hardening heat treatment, can be eliminated with the use of the ramped seal face 80. This permits use of Vickers hardnesses of about 200 Hv, as compared to the prior art requirements of a Vickers hardness in a range of about 650 to 850 Hv. Thus, manufacturing costs and the potential for error are reduced.

Figure 5:
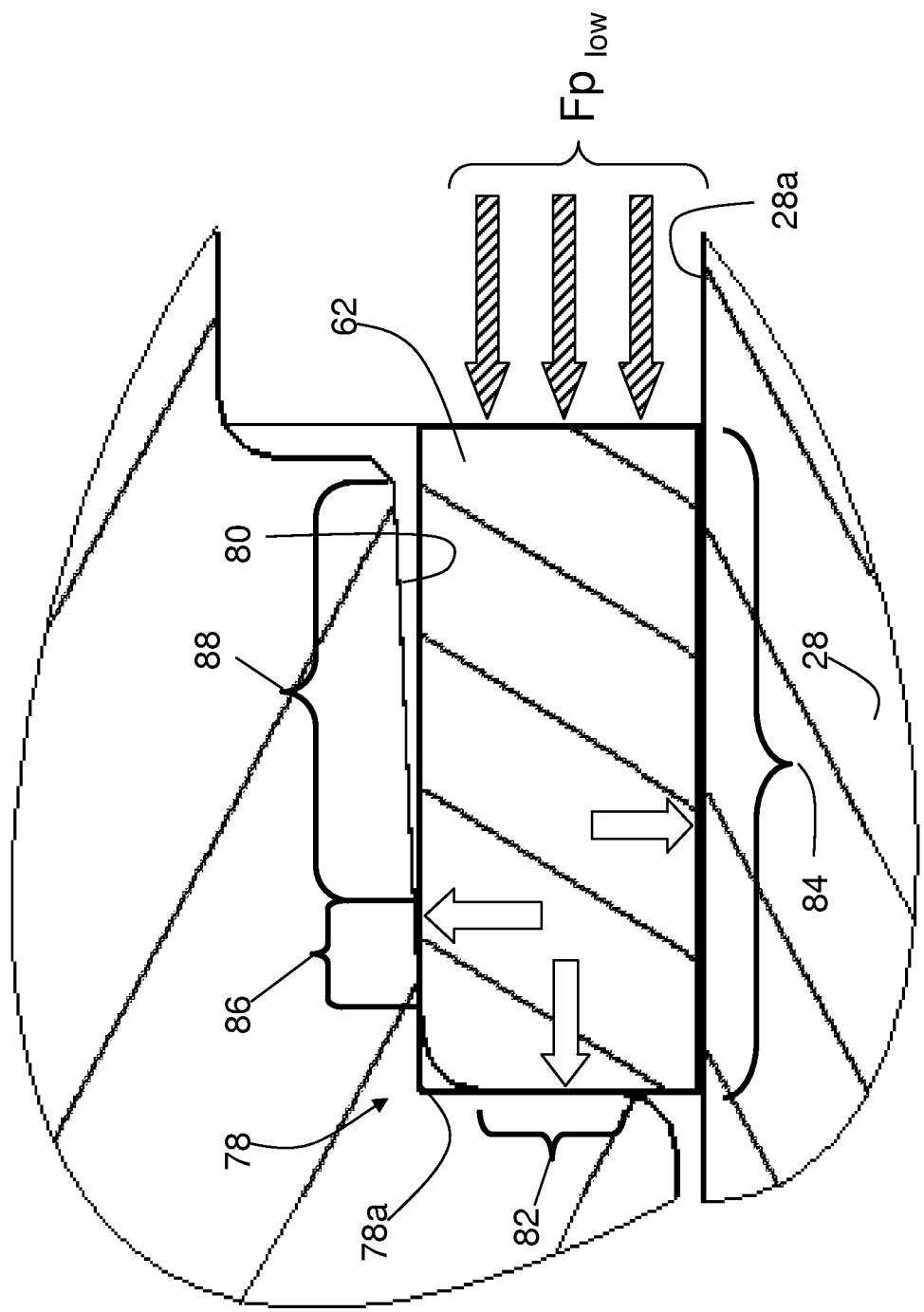
FIG. 5 is an enlarged cross sectional view of the high pressure seal of FIG. 4A shown under low pressure loads as applied in FIG. 4A.

Referring now to FIGS. 4A and 5, the ramped seal face 80 provides a sealing surface that is defined by two regions. A first region 86 is defined generally near the intersection of the backing seal surface 82 and the ramped seal face 80. This intersection defines a seal pocket corner 78a. A second region 88 extends from the first region 86 toward the end of the ramped seal face 80. The first region 86 contacts the high pressure seal 62 and traps the portion of the high pressure seal 62 pressed between the first region 86 and the inner bore 28a. The second region 88 provides a gap or clearance between the high pressure seal 62 and the ramped seal face 80. This configuration forms a sealing surface area that is less than the entire contacting seal surfaces of the high pressure seal 62. The reduced sealing area of the high pressure seal 62 within the seal pocket 78 provides fluid sealing that is effective at low piston velocities, which, in one embodiment, may be on the order of about 10 mm per second. The second region 88 may admit a limited amount of fluid that acts to more evenly press the high pressure seal 62 against the inner bore 28a. The lower sealing area, created in part by the first sealing region 86 of the ramped seal face 80 acting under lower fluid pressures, $Fp_{low}$, allows for free movement of the high pressure seal 62 over the sliding seal surface 84 and prevents binding of the seal within the seal pocket 78 during pumping. In one embodiment, the range of pressures associated as lower fluid pressures, $Fp_{low}$, may be in a range of 0 bar gage pressure to 1 bar gage pressure (approximately 14.5 psi). The high pressure seal deflection shown in FIG. 5 may also be influenced by the operating temperature as it affects low residual strain materials. Such an influence is different from typical high pressure seal materials, such as a 30% glass-filled nylon 6,6 material.

Figure 6:
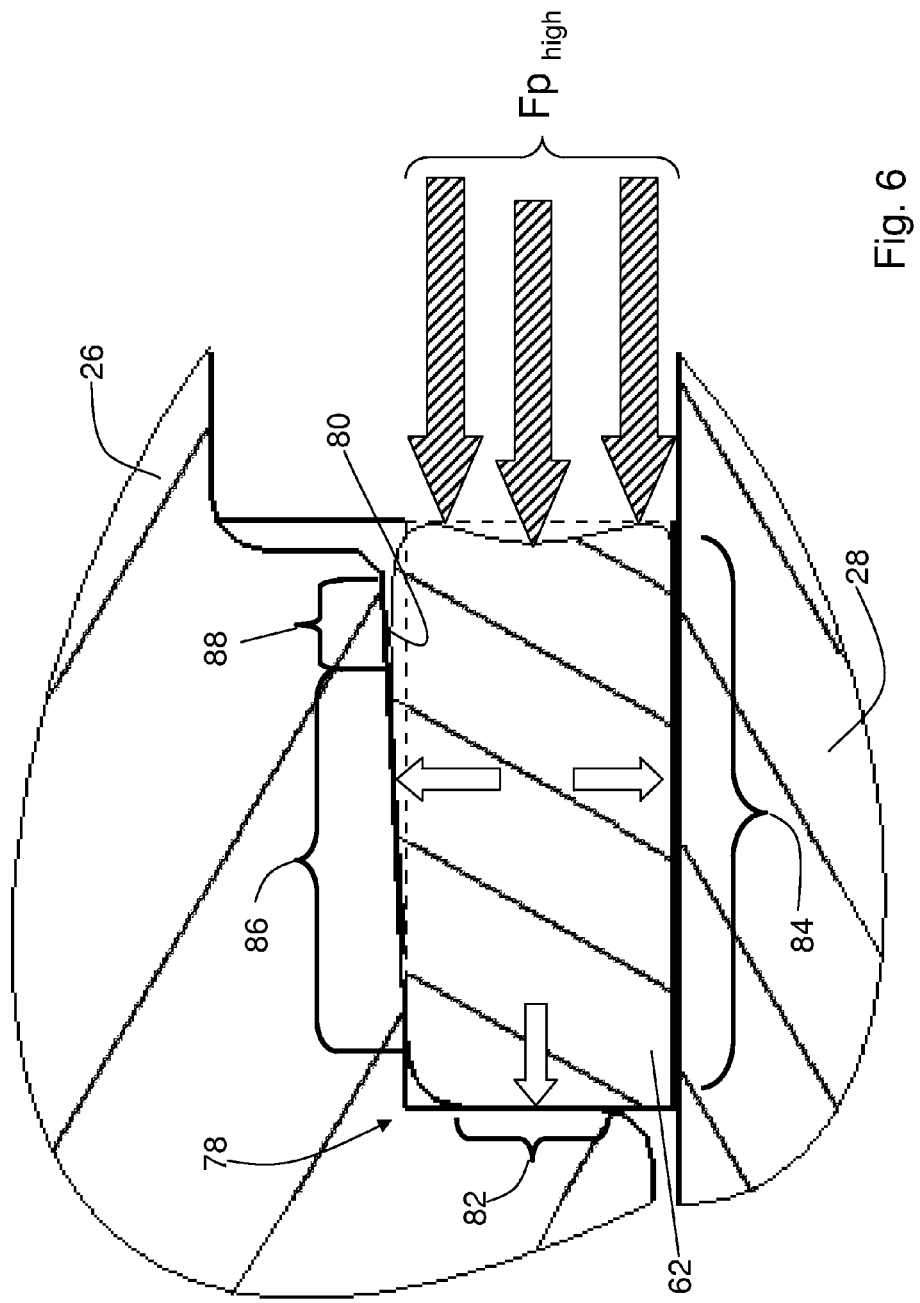
FIG. 6 is an enlarged cross sectional view of the high pressure seal of FIG. 4A shown under high pressure loads as applied in FIG. 4A.

Referring now to FIG. 6, as the velocity of the piston 26 is increased, the fluid pressure forces Fp increase to a higher level, $Fp_{high}$. In one embodiment, the range of pressures associated as higher fluid pressures, $Fp_{high}$, may be in a range of 1 bar gage pressure to 250 bar gage pressure. This, in turn, causes a deflection of the high pressure seal 62 within the seal pocket 78. The deflection of the high pressure seal 62 under the higher fluid forces $Fp_{high}$ causes the first region 86 to increase in area and the second region to decrease by a corresponding amount. The increased seal area is effective to resist fluid leakage and provide increased fluid output at the desired higher pressure level and at high efficiency. The high pressure seal 62 will also deflect similarly under increasing operating temperatures. Thus, the deflection depicted in FIG. 6 may be a function of both piston velocity and operating temperature. In both of the operating configurations of FIGS. 5 and 6, the volume of the seal pocket 78 is generally larger than the volume occupied by the high pressure seal 62. The proportional contact and trapping of the high pressure seal 62 within the seal pocket 78 by the first sealing region 86 provides a self-energizing seal interface that provides increased sealing and fluid pumping efficiency at increasing pressures. Additionally, the wedging action of the seal against the ramped seal face 80 within the seal pocket 78 contributes to the self-energizing effect of the sealing system. Thus, the high pressure seal 62, formed from a low strain material as will be explained below, is configured to deform within the seal pocket 78 and define a sealing surface area interface with the ramped seal face 80 that is directly proportional to fluid pressure. As the fluid pressure increases, the contact of the high pressure seal 62 against the first region 86 increases to form the fluid-tight seal.

The high pressure seal 62 can be made of a material having a low residual strain level such as, for example, polytetrafluoroethylene (PTFE, also known as DuPont's Teflon® material) rather than other commonly used high pressure seal materials, such as thermoplastic polymers like nylon, which may further be a 30% glass-filled Nylon 6,6 material. The high pressure seal 62, formed from PTFE, is generally more compliant at high temperatures than typical thermoplastic seals, which has been viewed as an impediment to seal performance. PTFE, on the other hand, is less abrasive and provides a low coefficient of friction as compared to the thermoplastic seal configurations. The low residual strain of the seal material causes the high pressure seal 62 to take a set, or not completely return to its previous shape, such as the original shape or the seal shape under the fluid pressure forces, $Fp_{low}$. These material characteristics of high temperature compliance and permanent or semi-permanent set have discouraged the use of PTFE and similar low residual strain materials for high pressure fluid seals in vehicular braking pump applications, such as for anti-lock braking systems (ABS), hill hold systems, and automatic cruise control (ACC) applications. As a consequence, conventional seals using thermoplastic materials require heat treatment processing to provide a hardened, wear-resistant surface that can withstand the more abrasive materials. Additionally, in conventional pumps, the surface finishes and dimensional tolerances are tightly controlled to maintain the fit between the conventional seals and the sealing surfaces.

During high temperature operation, material creep or permanent set of conventional seal materials forms potential leak paths between the seal interfaces. These leak paths become more prevalent and impact operation of the braking applications listed above. For example, during initial operation typical braking hydraulic components, such as pumps generally, are at a relatively lower temperature than their design steady state temperature. Their design steady state temperature may be in a range of about 25° C. to about 60° C. In one embodiment, an example of operating temperature ranges may be defined as a high temperature operating range being from about 100° C. to about 125° C. and a low temperature operating range being from about −20° C. to about −40° C. These ranges are for general illustrative purposes of high and low temperature ranges and specific high and low temperatures can fall outside of these ranges and still be considered "high" and "low" temperatures, if desired. When initially operating, the dimensional changes of the high pressure seal, due to the permanent set, and the dimensional changes of the seal pocket, due to thermal expansion/contraction, cause leak paths. These leak paths can be somewhat compensated for in higher pressure braking functions, like ABS. At normal operating conditions, i.e., higher temperature than initial operation, the softer nature of low residual strain materials can also generate leak paths by the fluid forces acting at the seal interfaces. The leak paths, whether at high or low temperatures, have a profound impact on braking systems that rely on low fluid flow changes, such as in ACC applications. The ACC braking applications use very low braking rates and low fluid pressures to maintain vehicle speed around a set speed. For a commercially acceptable ACC system, the braking necessary to maintain the set speed needs to be as transparent to the driver as possible. Thus, leak paths cause the braking system to react sluggishly and the overdrive or underdrive the set speed.

Referring now to FIG. 7, there is illustrated a second embodiment of a hydraulic pump 120, similar to hydraulic pump 20, having a high pressure seal 162 disposed within a seal pocket, shown generally at 178. The seal pocket 178 is generally defined by a piston stop collar 126b of a piston 126, an inner bore 128a of a sleeve 128, and a ramped seal face 180 formed into the piston 126. The piston stop collar 126b defines a backing seal surface 182. The inner bore 128a includes a sliding seal surface 184. The ramped seal face 180 provides a first region 186, and a second region 188. The intersection of the backing seal surface 182 and the ramped seal face 180 together define a seal pocket corner 178a. The seal pocket 178 contains the high pressure seal 162 and provides orientation of the various sealing surfaces relative to the high pressure seal 162, similar to the seal pocket 78 described above.

The high pressure seal 162 includes an adjustment profile 190, shown in FIG. 7 as a chamfer. The adjustment profile 190 is configured to permit adjustment of the volume of the high pressure seal 162 such that the seal volume may be smaller than the volume defined by the seal pocket 178. The adjustment profile 190 also permits the seal contact regions to be resized and/or repositioned along the various sealing surfaces of the seal pocket 178. The adjustment profile 190 is formed having a chamfer angle β which may be in any range from nearly parallel to the backing seal surface 182 to 60 degrees or greater, depending on the desired position of the ramped seal face first region 186. The adjustment profile 190 is spaced apart from the seal pocket corner 178a such that the high pressure seal 162 can deform under fluid pressure toward the seal pocket corner 178a, thereby occupying a smaller volume than provided by the seal pocket 178. This prevents wedging of the high pressure seal between the ramped seal surface 180 and the sliding seal surface 184 and reduces leak path formation. Alternatively, the adjustment profile 190 may be shaped differently to provide spacing between the seal pocket cornet 178a and the high pressure seal 162.

Referring now to FIG. 8, there is illustrated a third embodiment of a hydraulic pump 220 having a piston 226 and a sleeve 228 that define a seal pocket, shown generally at 278, of a ramped seal face 280. The seal pocket 278 is configured in a similar manner to the seal pockets 78 and 178 described above and includes a seal pocket corner 278a, shown as a small dimensioned radius. A high pressure seal 262 is similar to the high pressure seal 178 and has an adjustment profile 290. The high pressure seal 262 is disposed in the seal pocket 278 and abuts a backing seal surface 282 that is similar to backing seal surfaces 82 and 182, described above. The adjustment profile 290 of the high pressure seal 262 is illustrated as a radius that is larger than the radius of the seal pocket corner 278a. This difference in radii provides room for the high pressure seal material to displace. This volume difference permits the sealing surfaces to be self energizing without binding during reciprocation of the piston 226 within the sleeve 228. The larger radius of the adjustment profile 290 also permits shifting of a ramped seal face first region 286 to a desired width and/or position on the ramped seal face. A second region 288 may be changed in width relative to the first region 286 as a result of the radius size of the adjustment profile 290.

Figure 9:
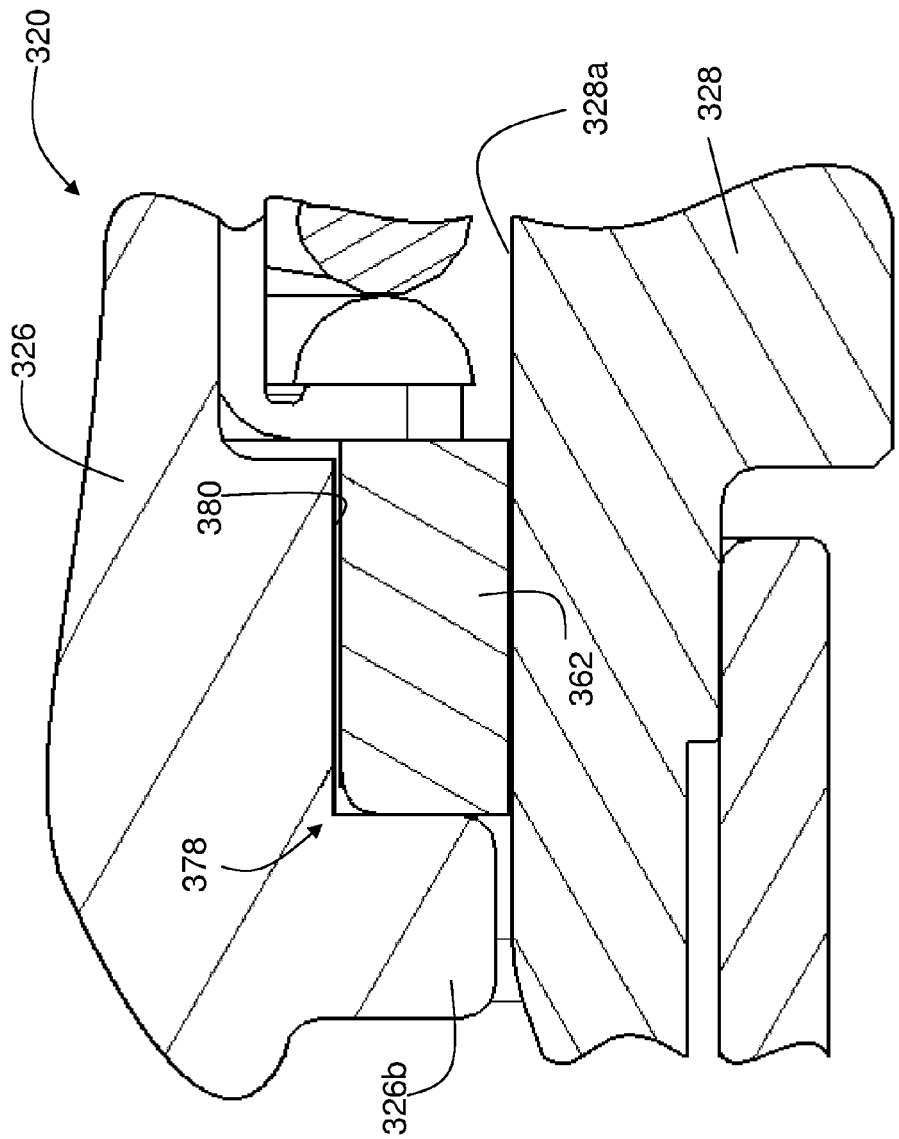
FIG. 9 is an enlarged cross sectional view of a prior art high pressure seal arrangement.

Referring now to FIG. 9, there is illustrated a portion of a prior art hydraulic pump, shown generally at 320. The pump 320 includes a piston 326 having a stop collar 326b and a sleeve 328 having an inner bore 328a. The piston 326 further includes a cylindrical seal face 380 that is generally parallel to the surface of the inner bore 328a. The piston stop collar 26b, the cylindrical seal face 380, and the sealing portion of the inner bore 328a cooperate to define a seal pocket 378. A high pressure seal 362 is disposed in the seal pocket 378 and is formed from a thermoplastic material, such as 30% GF Nylon 6,6. The nylon seal material is more rigid than the low strain materials of the previous embodiments and, thus, cannot deform as much in response to the applied fluid pressure and elevated operating temperatures. Fluid pressure acting on the high pressure seal 362 compresses the seal into the seal pocket 378 such that the seal creates a fluid-tight fit against the cylindrical seal face 380, the stop collar 326b, and the inner bore 328a. Such a fluid-tight fit between the cylindrical seal face 380 and the sliding seal surface of the inner bore 328a causes an increased normal force to be exerted across the entire seal faces. The increased normal forces over the larger contact area of the seal faces tend to wedge or bind the seal within the seal pocket 378. This contact prevents fluid loss at high fluid pressures but also causes increased drag and seal wear. This increased force also causes greater wear that is exacerbated by any reinforcing glass filling used to toughen the seal material. As such, the inner bore 328a is heat treated to provide a greater wear resistance against the seal. At lower fluid pressures, the seal fits are relaxed causing leak paths which degrade low fluid flow control applications, as discussed above.

While the material properties of nylon, and other applicable thermoplastics, may compensate for the high pressure and high temperature environment of vehicular brake pumping applications, they require tighter dimensional controls and more wear resistant seal surfaces. Another result of using materials such as nylon in braking system high pressure seal applications is the generation of leak paths, which are influential in reducing performance in certain powertrain control systems, such as ACC.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicular hydraulic braking pump comprising:
   a sleeve having an inner bore defining an inner bore surface;
   a piston having a stop collar and a ramped seal face, the stop collar, ramped seal face, and the inner bore cooperating to define a seal pocket having a geometry that promotes a self-energizing seal interface; and
   a high pressure seal disposed in the seal pocket, the high pressure seal creating the self-energizing seal interface with the seal pocket by increasing a sealing pressure between the sleeve inner bore and the piston during exposure to a high pressurized hydraulic fluid acting against the high pressure seal during a fluid compression stroke of the piston and relaxing contact between the sleeve inner bore and the piston during a fluid intake stroke of the piston.

2. The vehicular hydraulic braking pump of claim 1 wherein the ramped seal face extends at a relative angular orientation to the sleeve inner bore.

3. The vehicular hydraulic braking pump of claim 2 wherein the relative angular orientation is in a range of about 1 degree to 10 degrees and tapers from a point generally near a backing seal surface of the piston to a generally increasing distance away from the inner bore surface.

4. The vehicular hydraulic braking pump of claim 1 wherein the geometry that promotes the self-energizing seal interface with the high pressure seal is the ramped seal face of the seal pocket defining a first region that traps at least a portion of the high pressure seal against the inner bore and a second region that provides clearance between the high pressure seal and the ramped seal face.

5. The vehicular hydraulic braking pump of claim 4 wherein the first region is in contact with the high pressure seal and the second region defines a clearance and a contact area of the first region is smaller than a clearance area of the second region when the high pressure seal is exposed to a low fluid pressure.

6. The vehicular hydraulic braking pump of claim 5 wherein the contact area of the first region is larger than the clearance area of the second region when the high pressure seal is exposed to a high fluid pressure.

7. The vehicular hydraulic braking pump of claim 1 wherein the high pressure seal is a low strain material seal configured to deform within the seal pocket and define a sealing surface area interface with the ramped seal face.

8. The vehicular hydraulic braking pump of claim 7 wherein the high pressure seal is a PTFE-based seal.

9. The vehicular hydraulic braking pump of claim 1 wherein the ramped seal face includes a first region that contacts the high pressure seal and a second region that defines a clearance between the high pressure seal and the ramped seal face.

10. The vehicular hydraulic braking pump of claim 1 wherein the volume of the seal pocket is generally larger than the volume occupied by the high pressure seal.

11. A vehicle braking system comprising:
    a master cylinder; and
    a hydraulic control unit (HCU) in fluid communication with the master cylinder and a plurality of wheel brakes, the HCU comprising:
       a hydraulic braking pump including a sleeve having an inner bore defining an inner bore surface, a piston having a ramped seal face, and a high pressure seal disposed between the ramped seal face and the inner bore, the ramped seal face defining a first region that contacts the high pressure seal and a second region that defines a clearance between the high pressure seal and the ramped seal face.

12. The vehicle braking system of claim 11 wherein the ramped seal face defines a first region that traps the high pressure seal against the sleeve inner bore and a second region defining a gap with the high pressure seal.

13. The vehicle braking system of claim 12 wherein the first region is smaller than the second region when the high pressure seal reacts against a low fluid pressure.

14. The vehicle braking system of claim 11 wherein the piston includes a stop collar that cooperates with the ramped seal face and the inner bore to define a seal pocket.

15. The vehicle braking system of claim 14 wherein a volume of the high pressure seal is smaller than a volume of the seal pocket.

16. The vehicle braking system of claim 11 wherein the high pressure seal is a low strain material high pressure seal and the sleeve inner bore is formed from a non-hardened free-machining steel material and the inner bore surface has a textured surface finish.

17. A reciprocating piston pump comprising:
    a sleeve having an inner bore;
    a piston disposed within the sleeve inner bore, the piston having a stop collar defining a backing seal surface and a ramped seal face, the stop collar, ramped seal face, and the inner bore defining a seal pocket;
    a high pressure seal disposed within the seal pocket, the high pressure seal being in contact with the sleeve inner bore and a portion of the ramped seal face, the high pressure seal being formed from a low strain material that deforms into general conformance with the seal pocket against a high fluid pressure during a piston compression stroke and relaxes during a low fluid pressure exposure; and
    an eccentric that causes the piston to reciprocate within the sleeve inner bore whereby the high pressure seal contacts a greater portion of the ramped seal face as the speed that the piston reciprocates increases.

18. The reciprocating piston pump of claim 17 wherein the high pressure seal is a PTFE-based seal, the inner bore is formed from a non-hardened free-machining steel material, and the inner bore surface has a textured surface finish.

19. The reciprocating piston pump of claim 17 wherein a volume of the high pressure seal is smaller than a volume of the seal pocket.

20. A vehicular hydraulic braking pump comprising:
    a sleeve having an inner bore defining an inner bore surface;
    a piston having a stop collar and a ramped seal face, the stop collar, ramped seal face, and the inner bore cooperating to define a seal pocket, the ramped seal face defining a first region that contacts the high pressure seal and a second region that defines a clearance between the high pressure seal and the ramped seal face; and a high pressure seal disposed in the seal pocket.

\* \* \* \* \*